United States Patent [19]

Sasaki et al.

[11] 4,370,731
[45] Jan. 25, 1983

[54] SYSTEM FOR ENTERING TEMPERATURE CONTROL DATA AND DISPLAYING IT WITH THE TEMPERATURE SCALE

[75] Inventors: Masayuki Sasaki, Kawasaki; Yoshio Oida, Funabashi; Hidetoshi Semi, Kamakura, all of Japan

[73] Assignee: Tokyo Shibaura Denki Kabushiki Kaisha, Tokyo, Japan

[21] Appl. No.: 148,036

[22] Filed: May 8, 1980

Related U.S. Application Data

[63] Continuation of Ser. No. 928,977, Jul. 28, 1978, abandoned.

[30] Foreign Application Priority Data

Jul. 30, 1977 [JP] Japan .................. 52-91614

[51] Int. Cl.³ .............. G06F 15/20; H05B 1/02
[52] U.S. Cl. .................. 364/900; 219/506; 364/557; 116/DIG. 47
[58] Field of Search .......... 364/200, 900, 557, 570; 219/10.55 B, 506; 340/711, 802, 804; 116/DIG. 47

[56] References Cited

U.S. PATENT DOCUMENTS

| 3,819,906 | 6/1974 | Gould, Jr. | 219/506 |
| 3,965,324 | 6/1976 | Mori | 219/10.55 B |
| 4,011,428 | 3/1977 | Fosnough et al. | 219/10.55 B |
| 4,041,466 | 8/1977 | Stuart | 364/900 |
| 4,119,957 | 10/1978 | Sasaki et al. | 340/711 |
| 4,131,786 | 12/1978 | Cooper | 219/506 X |

Primary Examiner—Raulfe B. Zache
Attorney, Agent, or Firm—Finnegan, Henderson, Farabow, Garrett & Dunner

[57] ABSTRACT

A system for entering a temperature setting into a memory store and for displaying it, wherein the temperature setting includes a temperature level portion and a temperature scale portion. The temperature level portion corresponds to the temperature at which a microwave oven, for example, is to be set and the temperature scale portion indicates whether the temperature level portion is calibrated in degrees Fahrenheit or degrees Celsius. The temperature level is inputted through a decimal keyboard and a key signal encoder. Gating circuits transfer the temperature level from the key signal encoder and the temperature scale from a temperature unit code generator to a memory under control of a preprogrammed instruction data generator. A display circuit and display unit are coupled to the memory for displaying the temperature setting. A temperature level is supplied to a temperature setting register through another gating circuit to provide the temperature level to a temperature control circuit external to the temperature entering and displaying system.

9 Claims, 23 Drawing Figures

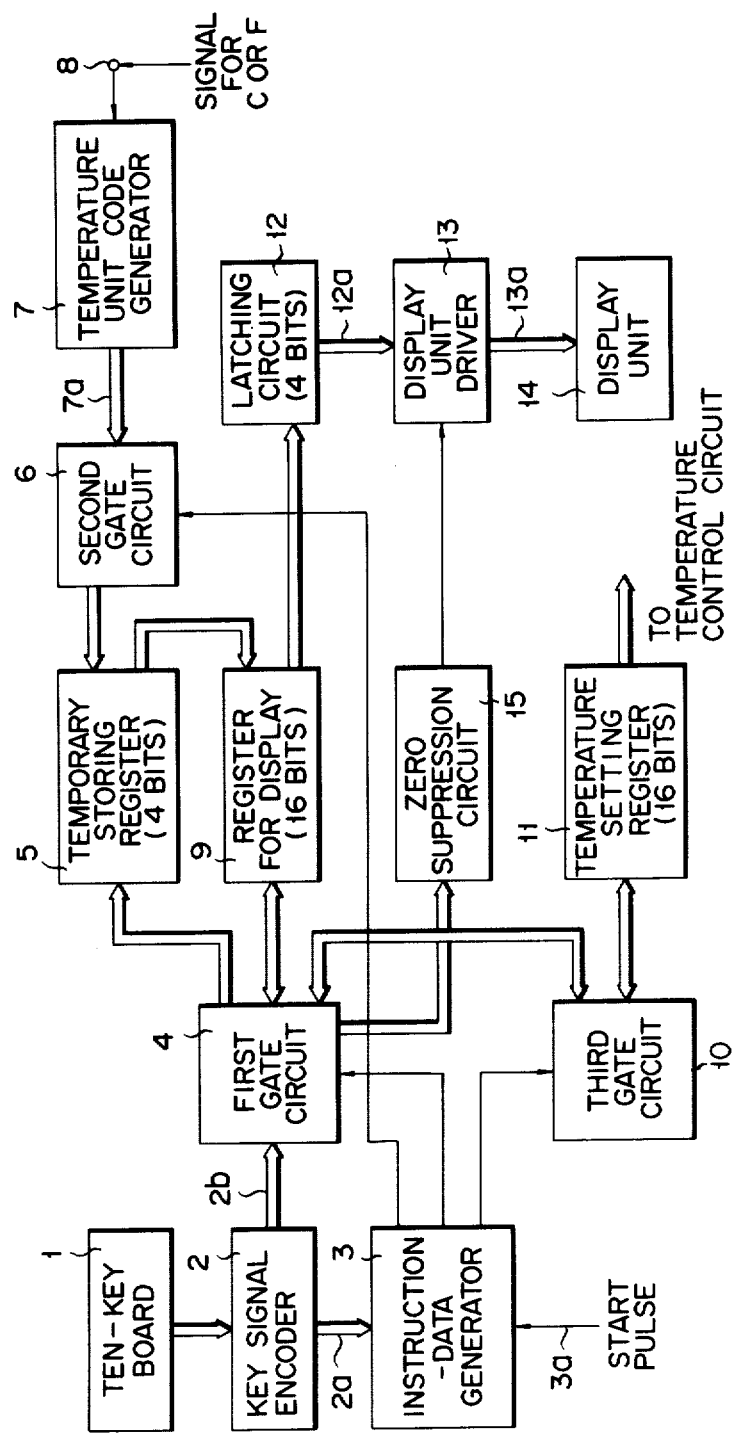
F I G. 1

FIG. 2A
(INSTRUCTION $J_0$)
REGISTER 5 
REGISTER 9 
$D_4 D_3 D_2 D_1$
REGISTER 11 
$D_4 D_3 D_2 D_1$
FIG. 2B
(INSTRUCTION $J_1$)
$D_4 D_3 D_2 D_1$
$D_4 D_3 D_2 D_1$
FIG. 2C
(INSTRUCTION $J_2$)
$D_4 D_3 D_2 D_1$
$D_4 D_3 D_2 D_1$
FIG. 2D
(INSTRUCTION $J_3$)
REGISTER 5 
REGISTER 9 
$D_4 D_3 D_2 D_1$
REGISTER 11 
$D_4 D_3 D_2 D_1$
FIG. 2E
(INSTRUCTION $J_4$)
$D_4 D_3 D_2 D_1$
$D_4 D_3 D_2 D_1$
FIG. 2F
(INSTRUCTION $J_5$)
$D_4 D_3 D_2 D_1$
$D_4 D_3 D_2 D_1$
FIG. 2G
(INSTRUCTION $J_6$)
REGISTER 5 
REGISTER 9 
$D_4 D_3 D_2 D_1$
REGISTER 11 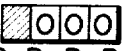
$D_4 D_3 D_2 D_1$

FIG. 3A
(INSTRUCTION $J_n$)

REGISTER 5    — 

REGISTER 9    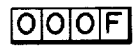
$D_4 D_3 D_2 D_1$

REGISTER 11    
$D_4 D_3 D_2 D_1$

FIG. 3B
(INSTRUCTION $J_{n+1}$)

REGISTER 5    

REGISTER 9    
$D_4 D_3 D_2 D_1$

REGISTER 11    
$D_4 D_3 D_2 D_1$

FIG. 3C
(INSTRUCTION $J_{n+2}$)

REGISTER 5    

REGISTER 9    
$D_4 D_3 D_2 D_1$

REGISTER 11    
$D_4 D_3 D_2 D_1$

FIG. 3D
(INSTRUCTION $J_{n+3}$)

REGISTER 5    

REGISTER 9    
$D_4 D_3 D_2 D_1$

REGISTER 11    
$D_4 D_3 D_2 D_1$

FIG. 3E
(INSTRUCTION $J_{n+4}$)

REGISTER 5    

REGISTER 9    
$D_4 D_3 D_2 D_1$

REGISTER 11    (row) 
$D_4 D_3 D_2 D_1$

FIG. 3F
(INSTRUCTION $J_{n+5}$)

REGISTER 5    — 

REGISTER 9    
$D_4 D_3 D_2 D_1$

REGISTER 11    
$D_4 D_3 D_2 D_1$

FIG. 3G
(INSTRUCTION $J_{n+6}$)

REGISTER 5    

REGISTER 9    
$D_4 D_3 D_2 D_1$

REGISTER 11    
$D_4 D_3 D_2 D_1$

FIG. 4A
REGISTER 5 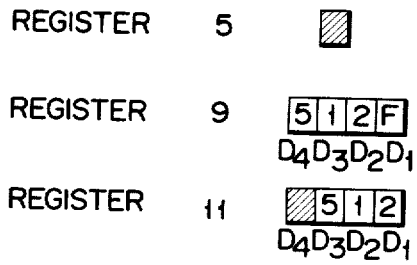
FIG. 4B (INSTRUCTION Jn)
FIG. 4C (INSTRUCTION Jn+1)
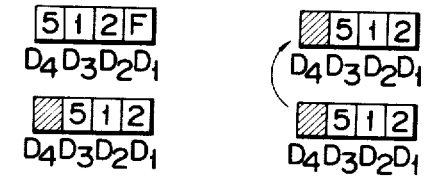
FIG. 4D (INSTRUCTION Jn+2)
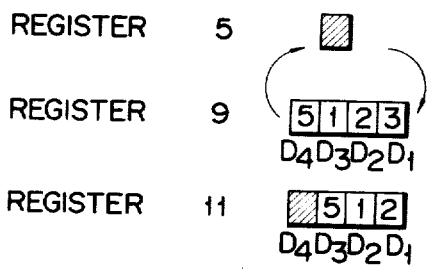
FIG. 4E (INSTRUCTION Jn+3)
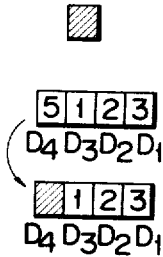
FIG. 4F (INSTRUCTION Jn+4)
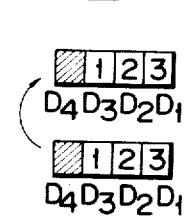
FIG. 4G (INSTRUCTION Jn+5)
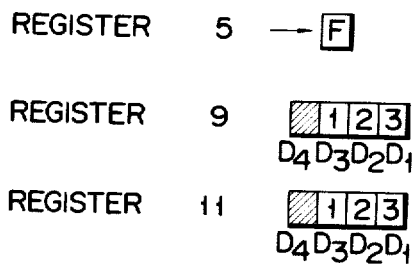
FIG. 4H (INSTRUCTION Jn+6)
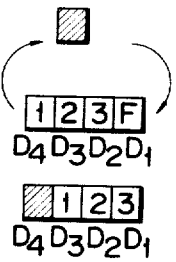

SYSTEM FOR ENTERING TEMPERATURE CONTROL DATA AND DISPLAYING IT WITH THE TEMPERATURE SCALE

This is a continuation of application Ser. No. 928,977, filed July 28, 1978, now abandoned.

BACKGROUND OF THE INVENTION

This invention relates to a temperature setting and display system for setting a temperature and displaying the set temperature.

For example, a microwave oven may be so designed as to allow, as required, the setting of power for heating food and cooking time, food heating power and food temperature, and keeping-warm temperature and time for keeping warm. These setting operations may be performed independently or sequentially. In controlling each of those temperatures, the microwave oven is started with a desired food temperature preset. The magnetron of the microwave oven is oscillated until the food temperature reaches the set temperature, when such oscillation is stopped. In controlling the keeping-warm temperature, the magnetron is on-off controlled so that food temperature may be adjusted to set temperature. Heretofore, in thus setting the food temperature, the temperature control has been achieved on the basis of either the Celsius or Fahrenheit scale. According to such prior art system, there may be caused a situation where the temperature setting must be performed in accordance with the Celsius scale in a region adopting the Fahrenheit temperature unit or a case in which the temperature setting is forced to be based on the Fahrenheit scale in a region adopting the Celsius temperature unit. Thus, the market for the microwave oven may be limited.

SUMMARY OF THE INVENTION

Accordingly, the object of this invention is to provide a temperature setting and display system capable of setting and displaying Celsius and Fahrenheit temperature data and of concurrently displaying a character to represent a temperature unit, i.e., scale, for the displayed temperature data.

In order to attain the above object, the system of the invention comprises a temperature data input means for inputting temperature data to be set and displayed, an instruction data generating means for successively generating a plurality of instruction data at the inputting of a start pulse and with every one-digit inputting of the temperature data, a temperature unit data input means for inputting a temperature unit data selected out of C (Celsius) and F (Fahrenheit) to be displayed, a first memory means coupled with the temperature data input means through a first gate means controlled by the instruction data and with the temperature unit input means through a second gate means controlled by the instruction data, and storing the temperature data and temperature unit data, a second memory means storing the temperature data stored in the first memory means through a third gate means controlled by the instruction data, and supplying the temperature data to a temperature control circuit, and a display means coupled to the first memory means for displaying the temperature data and temperature unit data stored in the first memory means.

According to an embodiment of this invention, the temperature unit data input means includes an input terminal which may be supplied with a signal at a high level H for the display of the Celsius temperature unit C or with a signal at a low level L for the display of the Fahrenheit temperature unit F, and a temperature unit code generator to generate a temperature unit code of e.g. 4 bits representing the temperature unit C or F, with the H-level or L-level signal supplied from the input terminal. The temperature unit code generator is controlled by a series of instruction data produced from the instruction data generator supplied with the start pulse, and the temperature unit code is stored in the first memory means. Then, the stored temperature unit code is converted into the other temperature unit code suited for the display in the display means, and displayed as a character on a display unit. This display unit is a segment display unit capable of displaying 4 digits, for example, and the character for the temperature unit is usually displayed in the position of the tail-end digit. The temperature data is displayed in the positions of the remaining three digits.

BRIEF DESCRIPTION OF THE DRAWINGS

FIG. 1 is a block diagram of an embodiment of the system of this invention;

FIGS. 2A to 2G show the changing processes of the digital arrangement in each individual memory means where the Fahrenheit temperature unit F only is displayed;

FIGS. 3A to 3G show the changing processes of the digital arrangement in each individual memory means where a temperature data "5" and the temperature unit data "F" are displayed; and FIGS. 4A to 4H show the changing processes of the digital arrangement in each individual memory means where a temperature data "3" is additionally inputted while a temperature data "512" and the temperature unit data "F" are displayed.

DETAILED DESCRIPTION OF THE PREFERRED EMBODIMENT

Referring now to FIG. 1, there is shown a temperature data input means which is composed of a ten-key board 1 and a key signal encoder 2. A data from a depressed key is converted into a 4-bit code data (e.g., BCD code) in the key signal encoder 2, the code data being supplied to a first gate circuit 4 as mentioned later. Further an address data 2a for designating a predetermined address of an instruction data generator 3 is produced from the key signal encoder 2. The instruction data generator 3 is supplied additionally with a start pulse 3a which is produced when a power switch (not shown) is turned on to supply a requisite power to the whole circuit of the apparatus as shown in FIG. 1, whereby another predetermined address is designated. The instruction data generator 3, which has previously stored a series of instruction data, successively produces the instruction data stored in each designated address. A code data 2b from the key signal encoder 2 is supplied to a temporary storing register 5 through the first gate circuit 4. The register 5, having a memory capacity of 4 bits or 1 digit, is further supplied with a code data 7a (4 bits) from a temperature unit code generator 7 through a second gate circuit 6. The temperature unit code generator 7 produces a 4-bit code data (L, H, H, H) corresponding to the Celsius scale (C) when a terminal 8 is supplied with a signal at a level "H", and produces a 4-bit code data (H, H, H, H) corresponding to the Fahrenheit scale (F) when the terminal 8 is supplied with a signal at a level "L". The output of the temporary storing register 5 is supplied to a register 9 for display; the registers 5 and 9 and the first gate circuit 4 forming a closed loop, reciprocally transmitting and receiving the data.

In this embodiment the registers 5 and 9 are given as a first memory means. The display register 9 has a memory capacity of 16 bits or 4 digits, transmitting and receiving the data to and from a temperature setting register 11 through the first gate circuit 4 and a third gate circuit 10. The temperature setting register 11 has a memory capacity of 16 bits or 4 digits, the content of which is supplied to a temperature control circuit (not shown). Further the data stored in the register 9 is supplied by 4 bits to a latching circuit 12 with a capacity of 4 bits, and to a zero suppression circuit 15 through the first gate circuit 4. The output of the zero suppression circuit 15 is supplied to a display unit driver 13. Such zero suppression circuit 15, however, is not essentially needed. The output (BCD code) of the latching circuit 12 is also supplied to the display unit driver 13. The display unit driver 13 converts the input BCD code into 7-bit sexadecimal code tabulated as in the following table, and supplies it to the display unit 14.

TABLE

| SERIAL NUMBER | INPUT CODE 12a TO DISPLAY UNIT DRIVER 13 | | | | SEXADECIMAL NUMBER | OUTPUT CODE 13a FROM DISPLAY UNIT DRIVER 13 | | | | | | |
|---|---|---|---|---|---|---|---|---|---|---|---|---|
| | A | B | C | D | | a | b | c | d | e | f | g |
| 1 | L | L | L | L | 0 | H | H | H | H | H | H | L |
| 2 | H | L | L | L | 1 | L | H | H | L | L | L | L |
| 3 | L | H | L | L | 2 | H | H | L | H | H | L | H |
| 4 | H | H | L | L | 3 | H | H | H | H | L | L | H |
| 5 | L | L | H | L | 4 | L | H | H | L | L | H | H |
| 6 | H | L | H | L | 5 | H | L | H | H | L | H | H |
| 7 | L | H | H | L | 6 | L | L | H | H | H | H | H |
| 8 | H | H | H | L | 7 | H | H | H | L | L | L | L |
| 9 | L | L | L | H | 8 | H | H | H | H | H | H | H |
| 10 | H | L | L | H | 9 | H | H | H | L | L | H | H |
| 11 | L | H | L | H | A | H | H | H | H | H | H | L |
| 12 | H | H | L | H | B | L | H | H | L | L | L | L |
| 13 | L | L | H | H | C | H | H | L | H | H | L | H |
| 14 | H | L | H | H | D | L | L | L | L | L | L | L |
| 15 | L | H | H | H | E | H | H | L | H | H | H | L |
| 16 | H | H | H | H | F | H | L | L | L | H | H | H |

In this embodiment, codes Nos. 1 to 10 in the above table are used for the codes to represent the temperature data; No. 15 for the Celsius temperature unit and No. 16 for the Fahrenheit.

While the figures stored in the display register 9 are supplied successively by 4 bits to the zero suppression circuit 15 through the first gate circuit 4, a digit given by "0" which has no significance in display, such as "0" of "05F", is detected in the zero suppression circuit 15. In this specification, a digit such as "0" of "05F", having no significance when displayed, is defined as "noneffective data" and a digit such as "5" of "05F", having significance when displayed, is defined as "effective data." The detected signal or zero suppression signal is supplied to the display unit driver 13. Accordingly, display of nonsignificant "0" in any places other than the first and second digits is suppressed in the display unit 14. The first, second and third gate circuits control the reciprocal transmission of various data between the key signal encoder 2, temporary storing register 5, temperature unit code generator 7, display register 9, and the zero suppression circuit 15, in accordance with the instruction data supplied from the instruction data generator 3.

It will be readily apparent to one of ordinary skill in the art that there can be numerous specific circuitry embodiments of the keyboard 1, key signal encoder 2, instruction data generator 3, latching circuit 12, display unit driver 13, display unit 14, and zero suppression circuit 15. As an example, instruction-data generator 3 can comprise a suitable programmable read only memory as employed in U.S. Pat. No. 4,011,428 issued to Fosnough et al. on Mar. 8, 1977. This reference also illustrates suitable embodiments for the keyboard 1 and the key signal encoder 2. U.S. Pat. No. 4,119,957 issued to Sasaki et al. on Oct. 10, 1978 and assigned to the assignee of the present invention further illustrates a suitable embodiment for the latching circuit 12, the display unit driver 13, and the display unit 14.

Referring now to FIGS. 2A to 2G, 3A to 3G, and 4A to 4H, there will be described the operation of the system as shown in FIG. 1. First, it is decided by the level of the signal given to the terminal 8 which of the temperature units C and F is to be used in setting and displaying the temperature data. In this embodiment, illustratively described will be a case in which a temperature based on the Fahrenheit scale is set and displayed with the terminal 8 supplied with the "L"-level signal. When the power switch (not shown) is turned on, the start pulse $3a$ is supplied to the instruction data generator 3. Then an address $A_0$ of the circuit 3 is designated, and an instruction data $J_0$ stored in the address $A_0$ first appears at the output. When the instruction data $J_0$ is supplied to the gate circuits 4 and 10, all of the contents of digits $D_1$ to $D_4$ of the display register 9 become "0", the contents of first to third digits $D_1$ to $D_3$ of the temperature setting register 11 become "0", and a fourth digit $D_4$ of the register 11 falls into a blank state (indicated by hatching) as shown in FIG. 2A. The blank stated means a constant "0" state, prohibited from turning into a binary "1" state. Further, the figure in the temporary storing register 5 also becomes "0". In other words, the contents of the registers 5, 9 and 11 are cleared. Then the address of the circuit 3 increases by 1, that is, an address $A_1$ is designated, and an instruction data $J_1$ stored in the address $A_1$ appears at the output. When the instruction data $J_1$ is supplied to the gate circuits 4 and 10, the contents of the digits $D_1$ to $D_4$ of the register 11 are transferred without change to the digits $D_1$ to $D_4$ of the display register 9. Consequently, as shown in FIG. 2B, the contents of the digits $D_1$ to $D_3$ of the display register 9 become "0", while the digit $D_4$ falls into the blank state. Then the address of the instruction data generator 3 increases by 1, whereby an address $A_2$ is designated. The circuit 3 produces an instruction data $J_2$ stored in the address $A_2$. When the instruction data $J_2$ is supplied to the gate circuit 4, the contents of the display register 9 are shifted by 4 bits to the left as illustrated. Consequently, the content of the digit $D_4$ of the display register 9 is transferred to the temporary storing register 5 through the gate circuit 4, and the content of the register 5 in turn is transferred to the digit $D_1$ of the register 9. Accordingly, the content of the temporary storing register 5 turns into the blank state, as shown in FIG. 2C. On the other hand, all the contents of the digits $D_1$ to $D_4$ of the register 9 become "0". Then the address of the instruction data generator 3 increases by 1, whereby an address $A_3$ is designated. Subsequently, the circuit 3 produces an instruction data $J_3$ stored in the address $A_3$. When the instruction data $J_3$ is supplied to the gate circuits 4 and 10, the contents of the digits $D_1$ to $D_3$ of the display register 9 are transferred to the digits $D_1$ to $D_3$ of the setting register 11. After this transfer, the contents of the temporary storing register 5 and of the digit $D_4$ of the setting register 11 are rendered blank, all the contents of the remaining digits being "0", as shown in FIG. 2D. Then the address of the instruction data generator 3 increases by 1, whereby an address $A_4$ is designated. The circuit 3 produces an instruction data $J_4$ stored in the address $A_4$. When the instruction data $J_4$ is supplied to the gate circuits 4 and 10, the contents of the digits $D_1$ to $D_4$ of the setting register 11 are transferred to the digits $D_1$ to $D_4$ of the display register 9, respectively. After this transfer, the contents of the digits $D_1$ to $D_4$ of the display register 9 are rendered equal to those of the digits $D_1$ to $D_4$ of the setting register 11, as shown in FIG. 2E. Then the address of the instruction data generator 3 increases by 1, whereby an address $A_5$ is designated. Further the circuit 3 produces an instruction data $J_5$ stored in the address $A_5$. When the instruction data $J_5$ is supplied to the gate circuit 6, the 4-bit code data (H, H, H, H) (corresponding to F), which is generated by the temperature unit code generator 7 in response to the L-level input signal to the terminal 8, is transmitted to the temporary storing register 5 through the gate circuit 6. On completion of such transmission, the code data (H, H, H, H) corresponding to the Fahrenheit temperature unit "F" is stored in the temporary storing register 5, as shown in FIG. 2F. Then the address of the instruction data generator 3 increases by 1, whereby an address $A_6$ is designated. The circuit 3 produces an instruction data $J_6$ stored in the address $A_6$. When the instruction data $J_6$ is supplied to the gate circuit 4, the contents of the display register 9 are shifted by 4 bits to the left, the content of the temporary storing register 5 is transferred to the digit $D_1$ of the display register 9, and the content of the digit $D_4$ of the display register 9 is transferred to the temporary storing register 5. Accordingly, after such transfer, a code data to indicate "000F" is stored in the digits $D_1$ to $D_4$ of the display register 9, as shown in FIG. 2G. Then the current figures in the display register 9 are shown in FIG. 2G. Then the current figures in the display register 9 are supplied by 4 bits to the latching circuit 12, the output of which is fed to the display unit driver 13. Meanwhile, the zero suppression circuit 15 is supplied with the storage contents of the display register 9 by 4 bits through the gate circuit 4. The zero suppression circuit 15 is used for checking the display register 9 successively from the digit $D_4$ to see if the contents of the register 9 are "0". When "0" is detected, a zero suppression signal is supplied to the display unit driver 13 synchronously with the digit "0". The display unit driver 13 exclusively drives those digits which are not supplied with such zero suppression signal from the zero suppression circuit 15 among the signals supplied from the latching circuit 12, allowing such digits to be displayed on the display unit 14. Consequently, "0F" is display on the displayed unit 14.

Referring now to FIGS. 3A to 3G, there will be described a case in which a Fahrenheit temperature "5" is set, and "5F" is displayed. When a key "5" of the ten-key board 1 is depressed, the key signal encoder 2 produces an address data 2a for designating an address An of the instruction data generator 3, as well as a BCD code 2b corresponding to "5". The instruction data generator 3 produces an instruction data Jn stored in the address An. When the instruction data Jn is supplied to the gate circuit 4, the BCD code 2b is transferred from the key signal encoder 2 to the temporary storing register 5 through the gate circuit 4. Consequently, the BCD code is stored in the temporary storing register 5 in response to "5", as shown in FIG. 3A. The current figures in the display register 9 still remain "00F" (see FIG. 2G). Then the address of the instruction data generator 3 increases by 1, whereby an address $A_{n+1}$ is designated. Further the circuit 3 produces an instruction data $J_{n+1}$ stored in the address $A_{n+1}$. When the instruction data $J_{n+1}$ is supplied to the gate circuits 4 and 10, the contents of the digits $D_1$ to $D_4$ of the setting register 11 are transferred to the digits $D_1$ to $D_4$ of the display register 9, respectively. On completion of such transfer, the contents of the display register 9 become equal to those of the setting register 11, as shown in FIG. 3B. Then the address of the instruction data generator 3 increases by 1, whereby an address $A_{n+2}$ is designated. Further the circuit 3 produces an instruction data $J_{n+2}$ stored in the address $A_{n+2}$. When the instruction data $J_{n+2}$ is supplied to the gate circuit 4, the figure stored in the temporary storing register 5 is transferred to the digit $D_1$ of the display register 9, and the content of the digit $D_4$ of the display register 9 is transferred to the temporary storing register 5. Accordingly, after completion of this transfer, "0005" is stored in the display register 9, whereas the storage content of the temporary storing register 5 is rendered blank, as shown in FIG. 3C. Then the address of the instruction data generator 3 increases by 1, whereby an address $A_{n+3}$ is designated. The circuit 3 produces an instruction data $J_{n+3}$ stored in the address $A_{n+3}$. When the instruction data $J_{n+3}$ is supplied to the gate circuits 4 and 10, the contents of the digits $D_1$ to $D_3$ of the display register 9 are transferred to the digits $D_1$ to $D_3$ of the setting register 11, respectively. On completion of the transfer, "005" is stored in the digits $D_1$ to $D_3$ of the setting register 11, as shown in FIG. 3D. Then the address of the instruction data generator 3 increases by 1, whereby an address $A_{n+4}$ is designated. The circuit 3 produces an instruction data $J_{n+4}$ stored in the address $A_{n+4}$. When the instruction data $J_{n+4}$ is supplied to the gate circuits 4 and 10, the contents of the setting register 11 are transferred without change to the display register 9. On completion of such transfer, the digit $D_4$ of the display register 9 is rendered blank, and the contents of the digits $D_3$ to $D_1$ of the display register 9 become "005". Then the address of the instruction data generator 3 increases by 1, whereby an address $A_{n+5}$ is designated. The circuit 3 produces an instruction data $J_{n+5}$ stored in the address $A_{n+5}$. When the instruction data $J_{n+5}$ is supplied to the gate circuit 6, the code data (H, H, H, H) of the temperature unit code generator 7 corresponding to F is transmitted to the temporary storing register 5. On completion of such transmission, the code data corresponding to "F" is stored in the temporary storing register 5, as shown in FIG. 3F. Further the address of the instruction data generator 3 increases by 1, whereby an address $A_{n+6}$ is designated. The circuit 3 produces an instruction data $J_{n+6}$ stored in the address $A_{n+6}$. When the instruction data $J_{n+6}$ is applied to the input of the gate circuit 4, the content "F" of the temporary storing register 5 is transferred to the digit $D_1$ of the display register 9, and the content of the digit $D_4$ of the display register 9 is transferred to the temporary storing register 5. After completion of such transfer, "005F" is stored in the display register 9, while "005" is stored in the digits $D_3$ to $D_1$ of the setting register 11, as shown in FIG. 3G. The figures stored in the display register 9 are supplied by 4 bits (1 digit) to the latching circuit 12, the output of which is supplied to the display unit driver 13 by 4 bits. The display unit driver 13 converts a 4-bit input code 12a into a 7-bit code (see Table above), and supplies it to the display unit 14. Since the zero suppression circuit 15 suppresses "0" with no significance, such as "00" of "005F" (see FIG. 3G), as aforesaid, the display unit 14 displays a Fahrenheit temperature "5F". Further the content "5" of the setting register 11 is supplied to the control circuit (not shown).

Subsequently, when a key "1" of the ten-key board 1 is depressed, a Fahrenheit temperature "51" is set by the temperature setting register 11, and "51F" is displayed on the display unit 14. When a key "2" of the ten-key board 1 is additionally depressed, a Fahrenheit temperature "512" is set in the temperature setting register 11, and "512F" is displayed on the display unit 14. Each time the key of the ten-key board 1 is depressed, the addresses $A_n$ to $A_{n+6}$ of the instruction data generator 3 are successively designated, and the instruction data $J_n$ to $J_{n+6}$ corresponding thereto are produced.

Now let us examine what temperature may be set and displayed when a key "3", for example, of the ten-key board 1 is depressed after the "512" is set and the "512F" is displayed. When the "512" is set, the content of the temporary storing register 5 is blank, that of the display register 9 is "512F" (all the digits $D_1$ to $D_4$ store the data), and that of the setting register 11 is "512", as shown in FIG. 4A. When the key "3" is depressed under these conditions, the key signal encoder 2 produces a signal to designate the address $A_n$ of the instruction data generator 3, as well as a BCD code 2b corresponding to the data "3". When the address $A_n$ is designated, addresses $A_{n+1}$ to $A_{n+6}$ are designated successively, so that the instruction data $J_n$ to $J_{n+6}$ are produced successively from the circuit 3 in the same manner as the aforementioned case of setting the temperature data "5". FIGS. 4A to 4H show how the data are transmitted among the registers 5, 7, 9 and 11 when those instruction data are supplied to the gate circuits 4, 6 and 10. Finally, a temperature "123" is set in the temperature setting register 11, and "123F" is displayed on the display unit 14, as shown in FIG. 4H.

Although according to the above description the Fahrenheit temperatures are set and displayed with "L"-level signals supplied to the terminal 8, Celsius temperatures may also be set and displayed by supplying "H"-level signals to the terminal 8. In this case, a form "XXXC" is displayed on the display unit 14 where "XXX" is an optional number to represent a Celsius temperature. It is to be understood that the system of this invention is not limited to the temperature setting and display for microwave ovens alone.

What we claim is:

1. A system for selectively setting a numerical temperature level and for displaying a temperature setting comprising the selected temperature level and an alphabetic temperature unit data indicating the temperature scale associated with said selected temperature level, wherein said temperature scale is in degrees Celsius or degrees Fahrenheit, said system comprising:

temperature data input means for entering the temperature level to be set and displayed;

temperature unit code generator means for entering the temperature scale associated with said temperature level;

memory means for combining a said temperature level entered by said temperature data input means with a said temperature scale entered by said temperature unit code generator means to form a said temperature setting and for storing said temperature-setting;

temperature-setting register means for storing a said temperature level;

first gate circuit means coupled to said temperature data input means and said memory means for transferring a said temperature level from said temperature data input means to said memory means;

second gate circuit means coupled to said temperature unit code generator means and said memory means for transferring a said temperature scale from said temperature unit code generator means to said memory means;

third gate circuit means coupled to said first gate circuit means and said temperature-setting register means for transferring temperature levels between said temperature setting register means and said memory means through said first gate circuit means and said third gate circuit means;

display means coupled to said memory means for displaying said temperature setting including said temperature level and said temperature scale stored in said memory means; and instruction data generator means coupled to said temperature data input means, said first gate circuit means, said second gate circuit means and said third gate circuit means for controlling (a) the transfer of a temperature level from said temperature data input means to said memory means via said first gate circuit means, (b) the transfer of a said temperature scale from said temperature unit code generator means to said memory means via said second gate circuit means, and (c) the transfer of a said temperature level between said temperature setting register means and said memory means via said first gate circuit means and said third gate circuit means to combine in said memory means a temperature level entered through said temperature data input means and a temperature scale entered through said temperature unit code generating means into a temperature setting in said memory means for display by said display means.

2. The system according to claim 1, wherein said temperature data input means includes a 10-key keyboard and a key signal encoder coupled to said keyboard for entering temperature levels in the form of successive 4-bit binary coded decimal codes.

3. The system according to claim 1, wherein said memory means comprises a first shift register with a capacity of one 4-bit BCD character and a second shift register with a capacity of four 4-bit BCD characters, and said temperature-setting register means comprises a third shift register with a capacity of four 4-bit BCD characters, the contents of said first shift register being shiftable to said second shift register, the contents of said second shift register being shiftable to said first shift register through said first gate circuit means, and the contents of said second shift register and said third shift register being bidirectionally shiftable therebetween through said first gate circuit means and said third gate circuit means under the control of said instruction data generator means.

4. The system according to claim 3, wherein said instruction data generator means includes a plurality of storage positions for storing instruction data for controlling said first gate circuit means, said second gate circuit means and said third gate circuit means.

5. The system according to claim 4, wherein said storage positions in said instruction data generator means are addressable by said 4-bit codes entered through said temperature data input means, said plurality of storage positions including first to seventh instruction data for initializing said first shift register, said second shift register, and said temperature-setting register means, said instruction data generator means further including eighth to fourteenth instruction data for controlling the shifting of (a) temperature levels between said temperature-setting register means and said second shift register, (b) temperature scale data between said temperature unit code generator means and said first shift register, (c) the contents of said first shift register to said second shift register, and (d) the contents of said second shift register to said first shift register, to assemble in said second shift register a said temperature setting.

6. The system according to claim 5, wherein said temperature unit code generator means includes means adapted to receive a temperature scale selector signal which is set to a first level corresponding to the Fahrenheit scale or a second level corresponding to the Celsius scale and produce a 4-bit BCD character corresponding to the Fahrenheit scale in response to said first level of said temperature scale selector signal or a different 4-bit BCD character corresponding to the Celsius scale in response to said second level of said temperature scale selector signal.

7. The system according to claim 6 wherein said first level of said temperature scale selector signal is a low-level "0", and said 4-bit character corresponding to the Fahrenheit scale is "1, 1, 1, 1", said second level of said temperature scale selector signal is a high-level "1", and said 4-bit character corresponding to the Celsius scale is "0, 1, 1, 1."

8. The system according to claim 3 wherein said display means comprises:
  a latching circuit coupled to said second shift register for latching a 4 bit BCD character supplied from said second shift register;
  a display unit driver for converting the 4-bit BCD character in said latching circuit into a display output comprising a 7-bit character; and
  a display unit for displaying said display output of said display unit driver.

9. The system according to claim 8, wherein said display means further includes a zero suppression circuit coupled between said first gate circuit means and said display unit driver for detecting zeroes in the high order bits of said temperature levels and for suppressing said detected high order zeroes thereby prohibiting said display unit from displaying said high order zeroes in a displayed temperature setting.

* * * * *